United States Patent
Tachiwana et al.

(10) Patent No.: US 9,663,402 B2
(45) Date of Patent: May 30, 2017

(54) METHOD FOR MANUFACTURING OPTICAL ELEMENT

(71) Applicant: HOYA CORPORATION, Tokyo (JP)

(72) Inventors: Kazuo Tachiwana, Tokyo (JP); Teruo Yamashita, Tokyo (JP); Shigeru Hayashi, Tokyo (JP); Junko Akojima, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/760,025

(22) PCT Filed: Dec. 19, 2013

(86) PCT No.: PCT/JP2013/084127
§ 371 (c)(1),
(2) Date: Jul. 9, 2015

(87) PCT Pub. No.: WO2014/109204
PCT Pub. Date: Jul. 17, 2014

(65) Prior Publication Data
US 2015/0353420 A1 Dec. 10, 2015

(30) Foreign Application Priority Data
Jan. 10, 2013 (JP) ................ 2013-002803

(51) Int. Cl.
*C03C 23/00* (2006.01)
*B24B 13/00* (2006.01)
*B24B 7/24* (2006.01)

(52) U.S. Cl.
CPC .......... *C03C 23/0075* (2013.01); *B24B 7/241* (2013.01); *B24B 13/00* (2013.01)

(58) Field of Classification Search
CPC .. B24B 1/00; B24B 7/24; B24B 7/241; B24B 7/242; B24B 13/00; C03C 23/0075
See application file for complete search history.

(56) References Cited

U.S. PATENT DOCUMENTS 6,093,484 A 7/2000 Oguma
6,312,317 B1 * 11/2001 Oguma .................. C03C 3/17
216/24

(Continued)

FOREIGN PATENT DOCUMENTS

GB 2019880 A 11/1979
JP S54-89392 A 7/1979
(Continued)

OTHER PUBLICATIONS

Jul. 23, 2015 International Preliminary Report on Patentability issued in International Patent Application No. PCT/JP2013/084127.
(Continued)

*Primary Examiner* — Timothy V Eley
(74) *Attorney, Agent, or Firm* — Oliff PLC

(57) ABSTRACT

Provided is a method for manufacturing an optical element from glass after polishing and in which either or both of a cleaning liquid used in a cleaning step for the glass after polishing and a rinsing liquid used in a rinsing step after the cleaning step are a liquid that inhibits expansion of cracked parts present on the surface of the glass after polishing.

8 Claims, 8 Drawing Sheets

(56) References Cited

U.S. PATENT DOCUMENTS

| | | | |
|---|---|---|---|
| 6,568,995 B1* | 5/2003 | Mitani | C11D 3/0042 451/36 |
| 7,972,398 B2* | 7/2011 | Nishimoto | C09G 1/02 451/41 |
| 2004/0244423 A1* | 12/2004 | Boontarika | C03B 40/00 65/102 |
| 2012/0111061 A1 | 5/2012 | Ikenishi | |
| 2013/0000214 A1* | 1/2013 | Chu | C09G 1/02 51/308 |
| 2013/0130596 A1* | 5/2013 | Matsui | C09K 13/00 451/41 |
| 2013/0183889 A1* | 7/2013 | Yoneda | C09K 3/1409 451/59 |
| 2015/0299029 A1* | 10/2015 | Tachiwana | C03C 3/247 501/44 |

FOREIGN PATENT DOCUMENTS

| | | |
|---|---|---|
| JP | H02-247650 A | 10/1990 |
| JP | 2000-301086 A | 10/2000 |
| JP | 3361270 B2 | 1/2003 |
| JP | 2010-108590 A | 5/2010 |
| JP | 2012-012282 A | 1/2012 |
| JP | 2012-233063 A | 11/2012 |
| WO | 2012/056979 A1 | 5/2012 |

OTHER PUBLICATIONS

Mar. 18, 2014 Search Report issued in International Application No. PCT/JP2013/084127.

\* cited by examiner

FIG. 3
(a) Test surface / Reference surface
Example 1
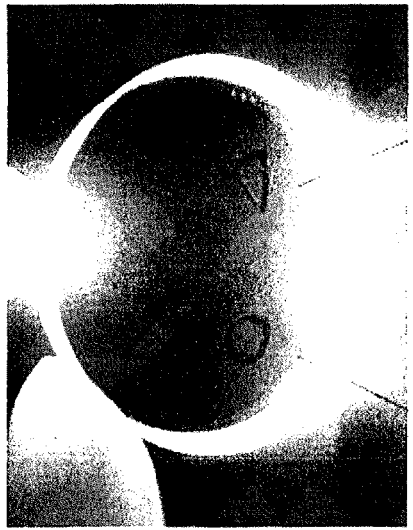
(b) Test surface / Reference surface
Comparative Example 1

METHOD FOR MANUFACTURING OPTICAL ELEMENT

BACKGROUND OF THE INVENTION

1. Field of the Invention

The present invention relates to a method for manufacturing an optical element.

2. Description of Related Art

Glass is used in many optical elements. During the steps of manufacturing the optical elements, a processing liquid, foreign matter or the like may adhere to a surface of the glass to thereby contaminate the surface. Therefore, a cleaning step is appropriately performed on the glass so as to keep the glass clean. Further, in order to rinse out the cleaning liquid used in the cleaning step, a rinsing step is also provided together with the cleaning step.

Typically, pure water, other deionized water (hereinafter referred to as DI (Deionized) water), or the like as described in Patent Document 1 is used as the rinsing liquid used in this rinsing step.

On the other hand, as the polishing liquid, technology of making pH of the glass approximate to pH of a dispersion liquid which contains a polishing agent is disclosed in Patent Document 2. This technology is based on the idea of inhibiting a chemical reaction between the glass and the polishing liquid (refer to para. [0010] of Patent Document 2). Also in the cleaning liquid or the rinsing liquid, technology has been disclosed, which makes pH of the glass approximate to pH of the cleaning liquid or the rinsing liquid to suppress the occurrence of latent scratches (refer to para. [0021] of Patent Document 2). Here, a standard for determining the quality of glass is based on the presence or absence of linear scratches having the width of 7 μm.

CITATION LIST

Patent Document (Patent Document 1) Japanese Patent Laid-Open Publication No. 2010-108590
(Patent Document 2) Japanese Patent No. 3361270

SUMMARY OF THE INVENTION

Technical Problem

Meanwhile, a glass processing treatment such as polishing or the like utilizes a polishing liquid, a grinding liquid, a grinding stone or the like which contains abrasive grains. Such abrasive grains may collide with a glass surface during the polishing treatment of the glass to thereby cause a cracked part of about 1 μm or less in width. Further, it has been found that such a cracked part is expanded in the cleaning step or the rinsing step after the polishing. Here, the term ⌈cracked part⌋ means at least any one of a recess formed in the vicinity of the glass surface and a part that is lower in density than the interior of the glass due to cracks or the like. Here, the cracked part has a predetermined depth and a predetermined width. The cracked part is different from linear scratches and is basically composed of a closed area. Furthermore, the expression ⌈the cracked part is expanded⌋ means that at least any one of the depth and the width of the cracked part is increased.

Conventionally, since an increase of light scattering intensity or non-uniformity (fogging) resulting from the expansion of the cracked part in the glass surface has not affected the performance of a product to which this glass is applied, it has not caused a problem. However, for example, with high performance of a recent digital camera, a medium- or large-diameter of glass lens has been required, in addition to an increase in size or an increase in number of pixels of an image pickup device. Here, even slight fogging resulting from the expansion of the cracked part may deteriorate the performance of a product.

One aspect of the present invention aims at providing a method for manufacturing an optical element having good product performance.

Solution to Problem

The present inventors have made attempts to solve the above-described problems. That results are Examples and Comparative Examples that will be described later. Although they will be described in detail in items of Examples, the studies of the present inventors made the following contents apparent.

When the glass subjected to polishing was cleaned by water such as DI water or pure water, fogging occurred appreciably. Further, it was found that, when comparing the cracked part before the cleaning step with the cracked part after cleaning step, the latter was increased in at least any one of the width and the depth of the cracked part. That is, the expansion of the cracked part has occurred.

The present inventors not only found this phenomenon but also studied the cause of the phenomenon. Consequently, this causes the inventors to conceive the following mechanism.

First, as a cause of occurrence of the cracked part, it is exemplified that abrasive grains used in the polishing are collided on the glass surface. Because of such a physical impact, at least any one of a recess and a low density part such as a crack or the like occurs on the glass surface immediately after the polishing, and potential damage remains under the recess or the low density part. In this state, if the cleaning step is performed by DI water or the like, the glass in the potential damaged part is selectively etched, thus resulting in expanding the cracked part. If the cracked part is expanded, a volume as a light scatter is increased, so that the light scattering intensity is increased and fogging looks to become denser with the naked eye.

The present inventors who have obtained the above knowledge makes attempt to inhibit the cracked part in the glass after the polishing from being expanded.

Eventually, they achieved a configuration for inhibiting the expansion of the cracked part, which is as follows.

One aspect of the present invention provides a method for manufacturing an optical element from glass after polishing, wherein at least any one of a cleaning liquid used in a cleaning step for the glass after the polishing and a rinsing liquid used in a rinsing step after the cleaning step is a liquid that inhibits a cracked part present on a surface of the glass after the polishing from being expanded.

Advantageous Effects of Invention

According to the present invention, it is possible to provide a method for manufacturing an optical element having good product performance.

BRIEF DESCRIPTION OF THE DRAWINGS

FIG. 3 is, for a glass substrate in Example 1 and a glass substrate in Comparative Example 1, a photograph illustrating a visual inspection result for occurrence of a change in quality of a glass surface with reference to a reference surface after a tape is detached from the glass substrate. FIG. 3(a) shows the result of Example 1, and FIG. 3(b) shows the result of Comparative Example 1.

FIG. 4(a) is a photograph of a test surface, and FIG. 4(b) is a photograph of a reference surface.

FIG. 5(a) is a photograph of a test surface, and FIG. 5(b) is a photograph of a reference surface.

FIG. 6(a) is a photograph of the test surface, and FIG. 6(b) is a photograph of the reference surface.

FIG. 7(a) is a photograph of a test surface, and FIG. 7(b) is a photograph of a reference surface.

FIG. 9(a) is a photograph of the test surface, and FIG. 9(b) is a photograph of the reference surface.

FIG. 10(a) is a photograph of the test surface, and FIG. 10(b) is a photograph of the reference surface.

DETAILED DESCRIPTION OF EXEMPLARY EMBODIMENTS

Hereinafter, the exemplary embodiment of the present invention will be described.

This exemplary embodiment will be described in the following order. Hereinafter, known technology may be used, unless otherwise specifically mentioned herein. The following steps are shown in FIGS. 1 and 2.

Figure 1:
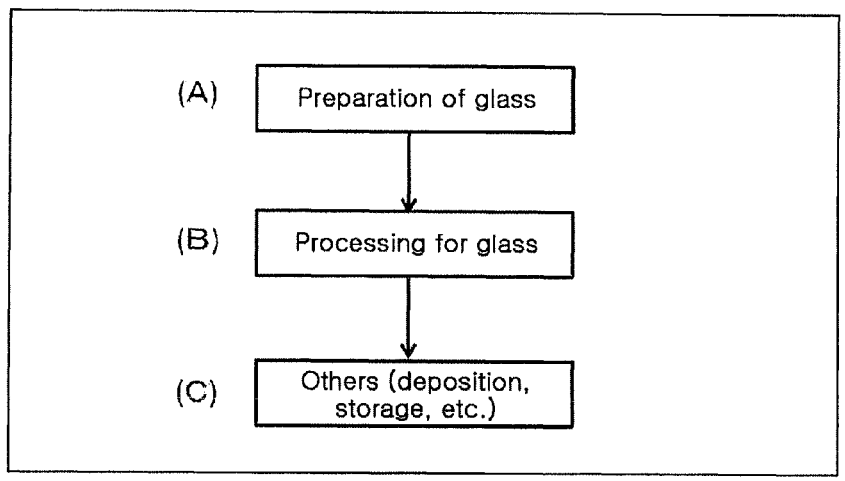
FIG. 1 is a flow chart illustrating a method for manufacturing an optical element according to a present exemplary embodiment.

FIG. 1 is a flow chart illustrating a method for manufacturing an optical element according to a present exemplary embodiment.

Figure 2:
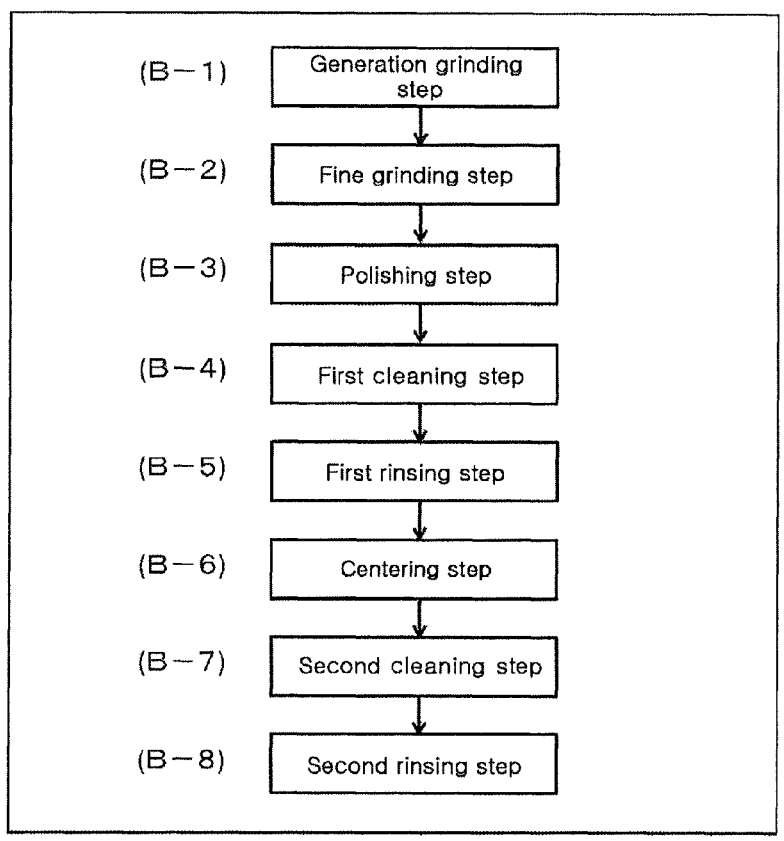
FIG. 2 is a flow chart illustrating respective steps in processing for glass, in the method for manufacturing an optical element according to the present exemplary embodiment.

FIG. 2 is a flow chart illustrating respective steps in B) processing for glass, in the method for manufacturing the optical element according to the present exemplary embodiment.

1. Method of manufacturing an optical element
A) Preparation of glass
B) Processing for the glass
B-1) Generation grinding step
B-2) Fine grinding step
B-3) Polishing step
B-4) First cleaning step
B-5) First rinsing step
B-6) Centering step
B-7) Second cleaning step
B-8) Second rinsing step
C) Others (Deposition, storage, or the like)
2. Effects of exemplary embodiment
3. Variants Further, in the present specification, the term「polishing」refers to polishing or grinding performed in at least any one of a generation grinding step, a fine grinding step, and a polishing step.

Furthermore, the term「glass after polishing」is intended to include two in the following. One of them is glass that is formed by polishing a glass material, namely, is formed into a lens shape by polishing a blank. The other is a preform that is formed by cold processing among preforms pre-molded articles to be used in mold press molding.

In this regard, the preform formed by the cold processing is subjected to the grinding step, such as the generation grinding step, the fine grinding step or the like, and the polishing step. Thus, the「glass after polishing」refers to the glass on which polishing which may cause a cracked part and potential damage has been performed.

The term「cleaning liquid」includes a liquid as cleaning use literally, for example, a liquid which contains a detergent. The term「rinsing liquid」is a liquid to be used in the rinsing step to be performed after the cleaning step, and also includes a liquid used to rinse out the cleaning liquid.

1. Method of Manufacturing an Optical Element

A) Preparation of Glass

In the present exemplary embodiment, glass refers to a glass material, a blank that becomes a material of an optical element as a glass article, or a semi-finished product that is in the stage before it becomes a finished product. Also, the glass of the present exemplary embodiment is not limited to a particular material and shape, as long as the glass has a quality sufficient to be marketed as the optical element. In this exemplary embodiment, the case of using fluorophosphate glass will be described.

B) Processing for Glass

B-1) Generation Grinding Step

First, a blank formed into a shape approximated to an optical element of a final shape is prepared. Then, a curve generating processing (CG processing) for performing a spherical-face processing, a toric-face processing and a free-curved-face processing as a cutting grinding method is carried out for this blank. A step of performing the CG processing is also referred to as a rough cutting step. By the CG processing, a portion of the blank that is to become a lens face is subject to the generation grinding processing in an approximate spherical shape, so that the lens face is obtained. Further, plane processing as well as the curved-face processing may be performed in the generation grinding step.

B-2) Fine Grinding Step

Subsequently, smoothing is performed for the glass that has been subjected to the CG processing and provided with a lens shape. This smoothing is a step for trimming the surface of the glass roughened by the CG processing. According to a specific example, the fine grinding processing is performed on the lens face while a grinding liquid is supplied, using a dish-shaped tool, the shape of which is an approximately inverted lens shape. This grinding liquid is a liquid which contains a surfactant or the like, and is used to enhance lubrication during the grinding processing and to cool a workpiece. Further, the fine grinding step may be omitted.

B-3) Polishing Step

Next, in the polishing step, the polishing processing is performed on the lens face while a polishing liquid is supplied, using a polishing tool, the shape of which is an approximately inverted lens shape, so that the lens face is finished to be smooth.

According to a specific example, for example, the polishing processing is performed on the lens face while a polishing liquid is supplied, using a dish-shaped tool, the shape of which is an approximately inverted lens shape with a polishing sheet attached thereto, so that the lens face is finished. This polishing liquid is a liquid which contains the abrasive grains (cerium oxide particles, zirconium oxide particles, etc.).

In any one of the B-1), B-2), and B-3) steps, the abrasive grains for polishing collide with the glass surface, thus generating the cracked part of about 1 μm or less. The cracked part (at least any one of the recess and the low density part) may be generated on the glass surface immediately after the polishing, and potential damage such as cracks to be generated from the cracked part may also occur. In order to inhibit the cracked part from being expanded, the following B-4) first cleaning step and B-5) first rinsing step are performed. Further, the present invention may be applied to both or either of the steps. However, in order to reduce possibility that the cracked part will be expanded, the present invention is preferably applied to both the steps.

B-4) First Cleaning Step

After the polishing step has been completed, the cleaning step is performed to clean the glass using a cleaning liquid so as to remove the polishing liquid or other contaminants. Specifically, after the processing (e.g., after the polishing processing or after the centering processing), the glass (optical lens) is placed on a holder, and is immersed in a cleaning bath that stores the cleaning liquid containing inorganic alkali, organic alkali or a surfactant, so that the glass is cleaned. In this case, a predetermined frequency (e.g., 50 kHz) of ultrasonic waves is preferably applied from a periphery of a bottom surface of the cleaning bath to the cleaning liquid to vibrate the cleaning liquid and thereby perform an ultrasonic cleaning operation. This cleaning operation may be carried out at a desired number of times in a plurality of baths. Further, the DI water may be used as in the prior art as the cleaning liquid. However, it is preferable to use a phosphate aqueous solution, in the same manner as the rinsing liquid that will be described later. That reason will be described in the following B-5) first rinsing step. It is possible to apply the present invention to both the cleaning liquid and the rinsing liquid. Although the present invention may be applied to any of the cleaning liquid and the rinsing liquid, the present exemplary embodiment will be mainly described with the rinsing liquid. Thereafter, all features of the rinsing liquid described in this exemplary embodiment may be applied to the cleaning liquid.

Further, in addition to the above-mentioned method, a method of manually wiping the glass by lens paper using an organic solvent may be performed. In this case, no expansion occurs in the cracked part of the glass surface.

B-5) First Rinsing Step

After the cleaning step, a rinsing step is performed to rinse out the cleaning liquid. To be more specific, the optical lens subjected to the above-described cleaning step is placed on the holder and then is immersed in a rinsing bath that stores the rinsing liquid, so that the rinsing step is carried out. Preferably, a predetermined frequency (e.g., 50 Hz) of ultrasonic waves is applied to the rinsing liquid to vibrate the aqueous solution and thereby perform an ultrasonic cleaning operation. This rinsing step may be performed at a desired number of times in a plurality of baths. It is not necessary to apply the ultrasonic waves. The phosphate aqueous solution is used as the rinsing liquid. Further, the first rinsing step may be performed as a series of processes included in the first cleaning step. In addition, the rinsing step may be performed by bubbling or in a jet or flowing water as well as the above-described method.

Further, if treatment by the DI water is performed under the use of the ultrasonic waves, etching is promoted, so that the expansion of the cracked part becomes pronounced. This is common to the cleaning step and the rinsing step.

Hereinafter, specific examples of the rinsing liquid according to the present exemplary embodiment will be described in detail.

In this exemplary embodiment, the rinsing liquid is a solution containing a solute and a solvent. According to this exemplary embodiment, for example, an aqueous solution containing phosphate ions ($PO_4^{3-}$, $HPO_4^{2-}$, and $H_2PO_4^-$) and alkali metal ions is used as the rinsing liquid. The pH of the aqueous solution is preferably controlled by these ions. Such a rinsing liquid contains phosphate as the solute and water as the solvent, for example. Moreover, the rinsing liquid may additionally contain known components according to its purpose.

The phosphate is not particularly limited. Examples of the phosphate include sodium dihydrogen phosphate ($NaH_2PO_4$), disodium hydrogen phosphate ($Na_2HPO_4$), sodium phosphate ($Na_3PO_4$), potassium dihydrogen phosphate ($KH_2PO_4$), potassium hydrogen phosphate ($KH_2PO_4$), potassium phosphate ($K_3PO_4$), or the like.

However, if the phosphate compound containing a substance (chelate complex) having a chelate effect, for example, tripolysodium phosphate (STPP: $Na_5P_3O_{10}$), is used as the solute, metal ions are included in the substance having the chelate effect, thus leading to the deterioration of the quality of the glass surface. Hence, it is preferable that no substance having the chelate effect is added to the rinsing liquid, and the rinsing liquid contains no substance having the chelate effect. The rinsing liquid may be a solution obtained by dissolving the solute such as phosphate in the solvent, or a solution obtained by adding acid and alkali to the solvent to neutralize it and thereby take a state in which a solute (salt) is dissolved in a solvent (water). In any case, a rinsing liquid contains a solute and a solvent.

The composition of the rinsing liquid will be described below in more detail. For example, a mixture obtained by mixing sodium dihydrogen phosphate and disodium hydrogen phosphate in a molar ratio of 1:1 is introduced into DI water or pure water in such a way that phosphorus and sodium have a concentration ranging from 10 to 1000 ppm, respectively. In this way, it is possible to prepare the rinsing liquid. As another example, the concentration of phosphorus may be in the range of 150 to 160 ppm. Further, it is found that the effect of the present invention is likewise achieved even in a concentration of 1/10 or 10 times or more the aforementioned concentration.

Alternatively, a predetermined concentration of sodium-dihydrogen-phosphate aqueous solution and a predetermined concentration of disodium-hydrogen-phosphate aqueous solution may be prepared, and then these aqueous solutions may be mixed with each other. Further, the pH and concentration of the rinsing liquid may be adjusted using $H_3PO_4$ and NaOH. In place of NaOH, K may be used as an alkali component. In this regard, if the introduction ratio of sodium dihydrogen phosphate is increased, the pH of the rinsing liquid tends to be reduced. In contrast, if the introduction ratio of disodium hydrogen phosphate is increased, the pH of the rinsing liquid tends to be increased. Thus, the pH of the rinsing liquid may be easily adjusted by adjusting the introduction ratio of a phosphoric acid component and an alkali component.

Further, according to this exemplary embodiment, the pH of the rinsing liquid is preferably in the range of 3 to 9.8, more preferably 5 to 9, much more preferably 6 to 8, and even more preferably 6.5 to 7.5. If the pH is within this range, the excessive elution of the components contained in the glass from the glass is prevented. In particular, it is preferable that an aqueous solution containing phosphate ions $PO_4^{3-}$" and controlled to have the pH of around 7 is used as a rinsing liquid.

Further, the temperature of the rinsing liquid is not particularly limited, and may be appropriately used within the range of 5 to 60 r including a room temperature, for example.

Meanwhile, there is a case where a high quality is not required in the entire surface of the glass. For example, an optical functional surface of an optical element is mostly a surface of the glass like an optical functional surface of a lens. In addition, surfaces other than the optical functional surface of the optical element, for example, surfaces corresponding to edges of the optical lens and the like do not undergo the degradation in performance as the optical element even if a latent scratch appears or a blur occurs. Therefore, in this exemplary embodiment, the term「 surface of glass」 refers to a surface (e.g., the optical functional surface of the optical element) requiring at least a high quality in the glass surface, and is not necessarily the entire surface of the glass. Further, it should be noted that the optical functional surface means a surface used for the light transmission, refraction, reflection, diffraction, or the like, which are the control target of the optical element.

B-6) Centering step

The centering step is a step of grinding an outer peripheral portion of glass obtained by the polishing processing or the mold press molding, about an optical axis to obtain a desired shape. Specifically, the optical element is sandwiched between a pair of bell holders and then centering is performed. Subsequently, while the lens is rotated about the central line and a centering liquid is supplied, a side peripheral surface of the lens is ground by diamond grinding stone or the like. In the same manner as the grinding liquid, the centering liquid is used to enhance the lubrication during the centering and to cool a workpiece. Thereby, the outer peripheral shape of the glass takes a true circle having the optical axis as a center when the glass is made into the lens. Known techniques may be applied to specific techniques of the centering processing.

If the glass after the centering has the diameter of 15 mm or more, the effects of this exemplary embodiment becomes further remarkable. As described above, here, a standard value of the size of the cracked part is 1 μm in width, for example, which is very small compared to the width of 7 μm of the linear scratch that is a reference in Patent Document 2. Further, a strict standard is likewise applied to the depth of the cracked part. If the depth of the cracked part is increased even though the width of the cracked part is not increased by the conventional rinsing step, consequently, it is impossible to clear the standard of the quality. On the contrary, if the width of the cracked part is increased even though the depth of the cracked part is not increased, consequently, it is impossible to clear the standard of the quality.

Moreover, in an optical element of the medium- or large-diameter using the glass, the diameter of which is 15 mm or more after the centering, the presence of the cracked part appears, and thus the necessity of inhibiting the cracked part from being expanded is further increased. This is a new challenge that may not be expected from Patent Document 2.

However, by using the technique of this exemplary embodiment, it is possible to inhibit the expansion of the cracked part. Therefore, even the optical element of the medium- or large-diameter using the glass, the diameter of which is 15 mm or more after the centering, can exhibit good product performance.

Further, the diameter of the glass after the centering is more preferably 30 mm or more, and even more preferably 60 mm or more.

The optical element according to the present invention may be applied to digital cameras for single-lens reflex, for example. Here, the digital cameras use an image pickup device such as a CCD (Charge Coupled Device) or CMOS (Complementary Metal Oxide Semiconductor) sensor which is referred to as 「APS-C (Advanced Photo System type C; e.g., size 23.4 mm×16.7 mm)」,「Full size (e.g., size 36 mm×24 mm)」,「Four Thirds (registered trademark), or Micro Four Thirds (registered trademark) (e.g., size 17.3 mm×13.0 mm)」or the like. Since the optical element of the medium- or large-diameter is used for such the large-sized image pickup device, the effect of the present exemplary embodiment becomes further remarkable.

B-7) Second Cleaning Step

After the centering step has been performed, the glass is cleaned in order to remove the processing liquid or sludge adhering to the glass. Although known technique may be applied to this cleaning step, it is preferable to perform the cleaning step with the above-described cleaning liquid.

The cleaning operation of manually wiping the glass using the lens paper, which is described in the B-4) first cleaning step, may also be performed in this step.

B-8) Second Rinsing Step

Subsequently, in order to rinse out the cleaning liquid adhering to the glass surface, the second rinsing step is performed on the glass. Although known technique may be applied to this rinsing step, it is preferable to perform rinsing step with the above-described rinsing liquid. Further, the second rinsing step may be performed as a series of processes included in the second cleaning step.

Others (Deposition, Storage, Etc.)

After the rinsing step of this exemplary embodiment is performed, various steps (e.g. drying step) required for manufacturing the optical element are performed. Further, an optical thin film such as an antireflection film, a total reflection film, a partial reflection film, or a film having spectral characteristics, if necessary, may be formed on the glass surface and then used as an optical element. Further, a protective film may be formed on the glass. Also, known techniques may be adopted as the deposition method.

Further, after or during various treatments including the above-described polishing, cleaning, rinsing, and the like, the glass may go through a storage step of immersing the glass in a storage liquid.

The glass according to the present exemplary embodiment is manufactured through the above-described steps. This glass may be used as an optical element as well as a semi-finished product that is in the state before it finally becomes an optical element.

The glass of this exemplary embodiment is very preferable as an optical element. Examples of the optical element may include an optical glass lens. As other specific examples, various kinds of lenses such as a spherical lens, an aspherical lens, or a micro lens, a diffraction grating, a lens having a diffraction grating formed thereon, a lens array, a prism, or the like may be exemplified. Further, in terms of a shape, a concave meniscus lens, a biconcave lens, a plane-concave lens, a convex meniscus lens, a biconvex lens, a plane-convex lens or the like may be exemplified.

Further, the optical element is preferable as a component of an image pickup optical system which has high performance and is compact, and is preferable for an image pickup optical system of a digital still camera, a digital video camera, a mobile phole-mounted camera, a vehicle-mounted camera, or the like. Furthermore, this is preferable for a plane optical element, a filter substrate, a color filter, a blue filter, a cover glass, a window, or the like.

2. Effect of Exemplary Embodiments

According to this exemplary embodiment, either of the cleaning liquid or the rinsing liquid serves as a liquid for inhibiting the expansion of the cracked part that is present on the glass surface after the polishing. As a result, even if a current optical element requires improved product performance, it is possible to clear the standard of a quality.

In particular, when the diameter of the glass after the centering is 15 mm or more, this makes the optical element having the medium- or large-diameter. Here, it is possible to inhibit the expansion of the cracked part by using the technique of this exemplary embodiment. Therefore, good product performance can be achieved even in the optical element of the medium- or large-diameter, which is made of the glass having the diameter of 15 mm or more after the centering.

Further, an optical element (collimating lens) for a laser projector requires high brightness of a projected image. However, if the cracked part is expanded on a surface of the optical element, a light beam may be scattered from a laser light source, thus causing a reduction in brightness. The optical element of the present exemplary embodiment may exhibit good product performance even in the optical element for such a purpose.

Furthermore, an optical element (focus lens) for laser processing requires a high output. However, if the cracked part is expanded on a surface of the optical element, a light beam may be scattered from a laser light source, thus causing a reduction in output, laser damage, or a dielectric breakdown due to laser light. The optical element of the present exemplary embodiment may exhibit good product performance even in the optical element for such a purpose.

3. Variants

Hereinafter, variants other than the above-described exemplary embodiment will be described.

(Cleaning Method and Rinsing Method)

Although the method for manufacturing the optical element has been described in the above-described exemplary embodiment, the present invention also has innovative technical characteristics in terms of the ⌈method of cleaning glass⌋ and the ⌈method of rinsing glass⌋.

(Grade of Glass)

As in the foregoing description, the glass of the above-described exemplary embodiment is not particularly limited. However, the present invention allows even glass having relatively low latent-scratch resistance ($D_{NaOH}$) to mitigate a negative influence of the rinsing liquid on the glass surface. In particular, it is preferable to apply the present invention to a glass type (i.e., glass type having the low latent-scratch resistance) that is prone to suffer a reduction in quality due to the latent scratch or the like.

(Rinsing Liquid Using Organic Compound)

In the rinsing liquid of the exemplary embodiment, water was used as the solvent in view of environment or cost. However, an organic compound may be used as the solvent.

(Rinsing Liquid Other than Phosphate Aqueous Solution)

The rinsing liquid is not particularly limited, as long as it may inhibit the expansion of the cracked part. Further, a compound is appropriately mixed with an aqueous solution of a compound (acetic acid, phthalic acid, or the like) used as a buffer solution, and then this mixture may be used as the rinsing liquid.

(Diversity of Conditions for Inhibiting the Expansion of the Cracked Part)

Further, the conditions for achieving the effects related to the above-described exemplary embodiment vary depending on the glass type of the glass or the like. In this specification, a case where the glass is fluorophosphate glass is mainly illustrated. Eventually, a liquid for inhibiting the cracked part present on the surface of the glass after the polishing from being expanded is used as the rinsing liquid, depending on the glass type.

(Composition of Glass)

Next, a composition example of the fluorophosphate glass will be described. However, glass used in the above-described exemplary embodiment is not limited to glass having the composition example.

First preferred glass (hereinafter, referred to as glass 1) of the fluorophosphate glass is glass containing an F content of 55 anion % or more, an O content of 45 anion % or less, namely, glass containing $F^-$ of 55 anion % or more and $O^{2-}$ of 45 anion % or less. When the surface of the glass is brought into contact with water, the expansion of the cracked part becomes more remarkable with the increase in the F content in the glass. Therefore, the effect of this aspect becomes more pronounced in the glass containing a higher F content. In the glass 1, more preferred glass is fluorophosphate glass (glass 1A) containing, as the glass components, $P^{5+}$ of 1 to 35 cation %, $Al^{3+}$ of 10 to 40 cation %, $Li^+$ of 0 to 25 cation %, $F^-$ of 55 to 99 anion %, and $O^{2-}$ of 1 to 45 anion %. Further, more preferred glass (glass 1B) in the glass 1A is fluorophosphate glass containing, as the glass components, $P^{5+}$ of 3 to 25 cation %, $Al^{3+}$ that is more than 30 cation % and is 40 cation % or less, $Li^+$ of 0 to 20 cation %, $F^-$ of 65 to 99 anion %, and $O^{2-}$ of 1 to 35 anion %.

In any of glass 1, glass 1A, and glass 1B, glass is more preferable, which contains, in addition to the above-described components, $Mg^{2+}$ of 0 to 15%, $Ca^{2+}$ of 0 to 35%, $Sr^{2+}$ of 0 to 25%, $Ba^{2+}$ of 0 to 20%, $Na^+$ of 0 to 10%, $K^+$ of 0 to 10%, rare earth ions of 0 to 7%, $Ca^{2+}$ of 3 to 35%, by cation %. Any of $Y^{3+}$, $Gd^{3+}$, $La^{3+}$, and $Yb^{3+}$, which do not color the glass, is preferable as the rare earth ions. It is preferable that a total content of $Y^{3+}$, $Gd^{3+}$, $La^{3+}$, and $Yb^{3+}$ ranges from 0.1 to 7 cation %. Further, in order to maintain the stability of the glass, among these rare earth ions, $Y^{3+}$ is preferably contained, and $Y^{3+}$ of 0.1 to 5 cation % is more preferably contained.

The glass 1 (including glass 1A and glass 1B) preferably has Abbe's number vd of 78 or more, more preferably 80 or more, much more preferably 85 or more, and even more preferably 90 or more. An upper limit of Abbe's number vd is naturally determined by the above-described composition, and may be 100 or less as the standard. Abbe's number vd generally depends on the F content contained in the glass. The more the F content is, the higher Abbe's number vd is. Thus, the higher Abbe's number vd of the glass is, the more remarkable the expansion of the cracked part is when the glass comes into contact with water. Therefore, the higher effect of this aspect is expected in the glass having higher Abbe's number vd.

$P^{5+}$ has the function of forming the network structure of the glass. In order to maintain the stability of glass, suppress volatilization when the glass is dissolved and thereby obtain optically homogeneous glass, the content of $P^{5+}$ is preferably set to be in the above-described range.

$Al^{3+}$ is the component that acts to improve the stability of the glass. The content of $Al^{3+}$ is preferably set to be in the above-described range in view of such an action.

$Li^+$ reduces the viscosity of glass melt but very strongly acts to lower liquidus temperature. Consequently, the viscosity of glass is increased at the liquidus temperature, thus suppressing the occurrence of striae when molten glass is molded. This also acts to lower glass transition temperature. To obtain such an effect, the content of $Li^+$ is preferably set to be in the above-described range. The preferred lower limit of $Li^+$ is 0.1 cation %.

$F^-$ is an essential component for imparting low dispersibility and anomalous dispersibility to the glass. To obtain the desired low dispersibility and anomalous dispersibility, the content of $F^-$ is preferably set to be in the above-described range.

The anion component of glass 1 is substantially comprised of $F^-$ and $O^{2-}$. In addition, a small amount of $Cl^-$ may be introduced as the anion component. When molten glass flows out from a platinum-based pipe, the glass may wet and swell an outer circumferential surface of the pipe and thereby may cause striae and the like. However, the addition of $Cl^-$ may achieve the effect of reducing the wetting and swelling of the glass melt.

To achieve the glass having good thermal stability, the total content of $F^-$ and $O^{2-}$ is preferably set to be 95% or more by anion %.

To improve the thermal stability and water resistance of glass, the content of each component of $Mg^{2+}$, $Ca^{2+}$, $Sr^{2+}$, $Ba^{2+}$, $Na^+$, and $K^+$ is preferably set to be in the above-described range.

The addition of a small amount of $Y^{3+}$ is expected to improve the thermal stability of the glass, whereas the addition of an excessive amount of $Y^{3+}$ rises the melting temperature of the glass, thus leading to volatilization from molten glass and reducing the thermal stability of the glass. Thus, the content of $Y^{3+}$ is preferably set to be in the above-described range. The content of $Y^{3+}$ is more preferably in the range of 0.1 to 7 cation %, and even more preferably of 0.1 to 5 cation %.

In addition, for the purpose of adjusting a refractive index, a small amount of $La^{3+}$, $Gd^{3+}$, $Zr^{4+}$ or $Zn^{2+}$ may be introduced.

Since $B^{3+}$ significantly increases the volatility of the glass, the content of $B^{3+}$ is preferably in the range of 0 to 1%, and it is more preferable that $B^{3+}$ is not substantially contained. Further, the expression ⌈not substantially contained⌋ means that $B^{3+}$ is never contained and a slight amount of $B^{3+}$ is contained such that the volatility of the glass is not exhibited.

Since Pb, As, Cd, Tl, Te, Cr, Se, U, and Th are substances having high environmental load, it is preferable that they are not introduced into the glass.

Glass 1 does not require components including Lu, Sc, Hf, Ge, or the like. Since Lu, Sc, Hf, and Ge are expensive components, it is preferable that they are not introduced. Glass 1 shows excellent light transmittance throughout a wide wavelength range of a visible range. From the viewpoint of utilizing the properties, it is preferable that substances causing the coloring, such as Cu, Cr, V, Fe, Ni, Co, Nd, Er, Tb, or Eu, are not introduced.

The preferred range of the refractive index nd is 1.42 to 1.53. Further, from the viewpoint of inhibiting the volatilization and the corrosion of glass 1, the molar ratio of the $O^{2-}$ content to the $P^{5+}$ content, namely, $O^{2-}/P^{5+}$ is preferably set to 3.5 or more.

Second preferred glass (hereinafter, referred to as glass 2) of the fluorophosphate glass is the glass that contains, by element mass %, P of 0.1 to 6%, Al of 0.8 to 22%, O of 1 to 20%, and F of 30 to 60%, wherein a total content of Ca, Sr and Ba exceeds 0 element mass %, and a value ((P+Al)/F) obtained by dividing a total amount of P and Al by the F content ranges from 0.1 to 0.4.

Glass 2 preferably contains Ca of 1 to 20%, Sr of 1 to 20%, Ba of 1 to 20%, F of 30 to 60%, O of 1 to 20%, Mg of 0 to 10%, and Y of 0 to 10%. According to glass 2, it is possible to obtain the glass having Abbe's number vd of 90 to 100.

Further, the glass using the fluorophosphate glass has been described by way of example in the above-described exemplary embodiment. However, the present invention may also be applied to the glass made of other substances. For example, the invention may be applied to phosphate glass or the like. Further, the expansion of the cracked part is particularly likely to occur in especially a soft glass material such as fluorophosphate glass.

Although the exemplary embodiments of the present invention have been disclosed for illustrative purposes, it will be understood that the present invention is not limited to the above-described exemplary embodiments and various changes are possible without departing from the scope of the present invention.

EXAMPLE

Next, examples will be described to specifically illustrate the present invention. Of course, the present invention is not limited to the following examples.

Example 1

First, a disc-shaped plane glass substrate (diameter of 43.7 mm and thickness of 5 mm) was used as glass. This plane substrate was previously polished. Further, the ⌈glass 1⌋ illustrated in the above-described exemplary embodiment was used as a glass material of the glass substrate. The cleaning after the polishing was performed by manually wiping the glass by the lens paper using the organic solvent.

Then, masking was performed by attaching tape to a portion of the glass substrate. After the masking was performed, the glass substrate was immersed in the rinsing liquid. In other words, a portion subjected to the masking becomes a reference surface that is not affected by the rinsing liquid. A portion of the glass substrate that is in contact with the rinsing liquid becomes a test surface. It is possible to confirm the degree of change in quality of a main surface of the glass substrate by comparing the test surface with the reference surface after the tape is detached therefrom.

In order to confirm the effect of the rinsing liquid according to the present example, the glass substrate was immersed in the bath containing the phosphate aqueous solution and then the rinsing step was performed. A plurality of baths each containing the phosphate aqueous solution therein was prepared, and the immersion was performed several times. In addition, ultrasonic waves were appropriately emitted.

Further, an aqueous solution containing $NaH_2PO_4$ and $Na_2HPO_4$ in the molar ratio of 1:1 and thereby having pH of 7.0 was used as the phosphate aqueous solution. The temperature of the phosphate aqueous solution was set to room temperature, and immersion time was set to one minute in total.

Thereafter, in order to perform the drying step, the glass substrate was immersed in the bath containing the organic solvent therein, and finally was subjected to steam drying.

In this way, the glass substrate according to this example was obtained.

Comparative Example 1

Comparative Example 1 used DI water in place of the phosphate aqueous solution that was used in the rinsing step of Example 1. Further, the temperature of the DI water was set to room temperature, and immersion time was set to one minute in total. The glass substrate was manufactured while other conditions remaining the same as Example 1.

<Evaluation 1>

Various evaluations were conducted for both the glass substrate of Example 1 and the glass substrate of the Comparative Example 1.

(Appearance Evaluation by Visual Inspection)

First, for the glass substrate of Example 1 and the glass substrate of the Comparative Example 1, it was visually inspected whether a change occurs in the quality of the main surface with reference to the reference surface after the tape was detached. The photograph showing the result is FIG. 3.

FIG. 3 is a photograph showing the result that is visually inspected whether the change occurs in the quality of the main surface with reference to the reference surface after the tape was detached, for the glass substrate of Example 1 and the glass substrate of the Comparative Example 1. FIG. 3(a) shows the result of Example 1 and FIG. 3(b) shows the result of Comparative Example 1. Further, an area of the drawing shown by ○ is the test surface that is in contact with the rinsing liquid, while an area of the drawing shown by ∆ is the reference surface that is not in contact with the rinsing liquid by the masking.

As seen in FIG. 3(a) (Example 1), a difference between the test surface and the reference surface was not visually observed. Also, the occurrence of fogging in the main surface of the glass substrate was not observed.

On the other hand, as seen in FIG. 3(b) (Comparative Example 1), the fogging occurred in the test surface.

(SEM Observation 1)

Next, for the glass substrate of Example 1 and the glass substrate of the Comparative Example 1, SEM (Scanning Electron Microscope) observation was performed. Photographs showing the results are FIGS. 4 and 5.

Figure 4:
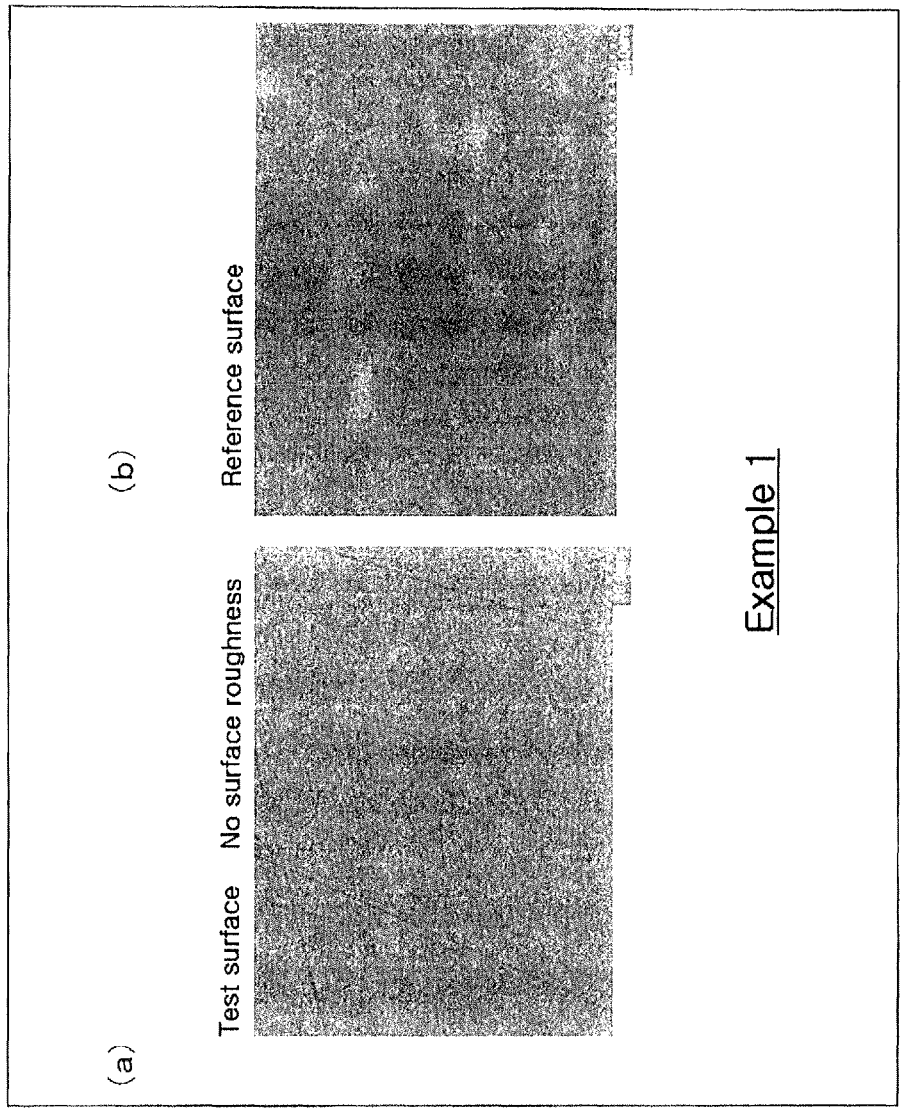
FIG. 4 is a photograph illustrating a result obtained through SEM observation for the glass substrate in Example 1.

FIG. 4 is a photograph illustrating the result obtained through SEM observation for the glass substrate in Example 1. FIG. 4(a) is a photograph of the test surface, and FIG. 4(b) is a photograph of the reference surface.

Figure 5:
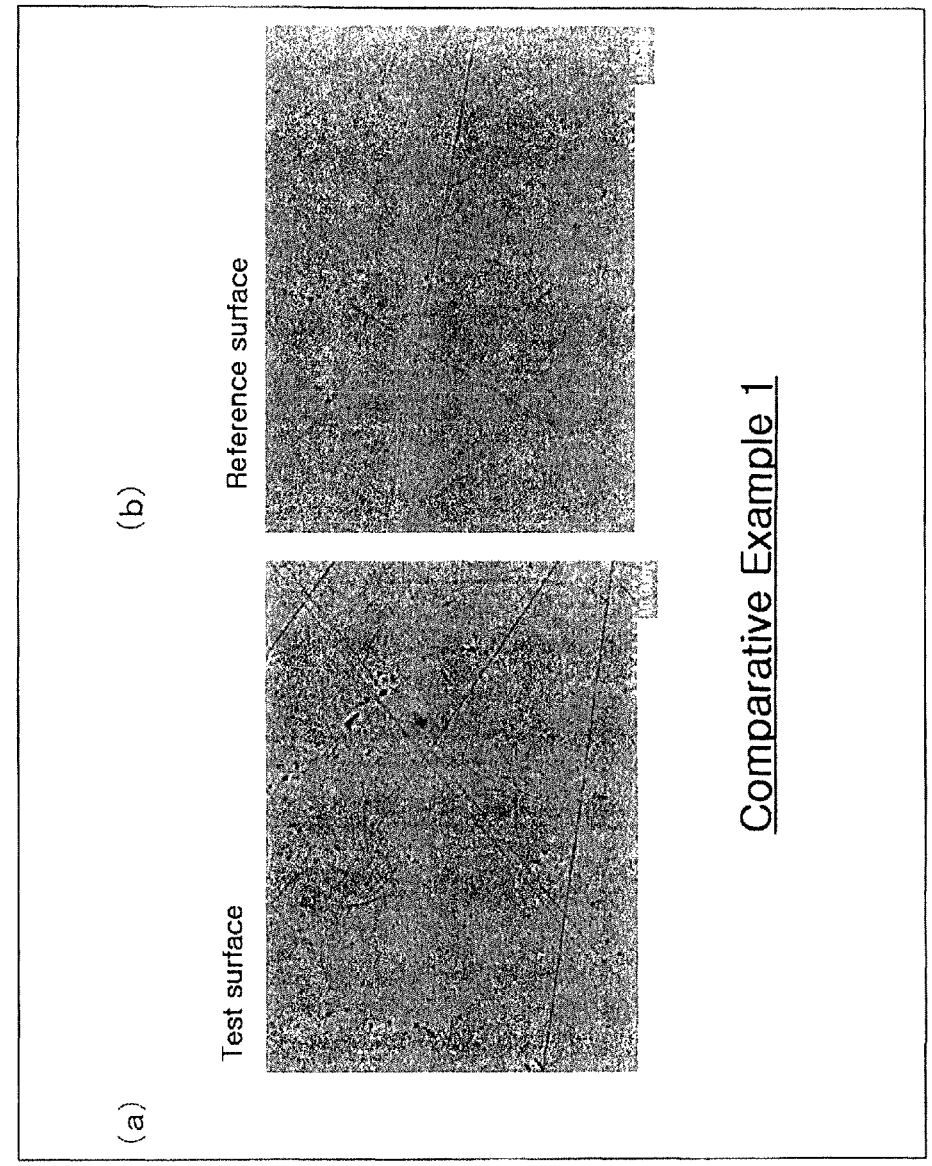
FIG. 5 is a photograph illustrating a result obtained through the SEM observation for the glass substrate in Comparative Example 1.

FIG. 5 is a photograph illustrating the result obtained through the SEM observation for the glass substrate in Comparative Example 1. FIG. 5(a) is a photograph of the test surface, and FIG. 5(b) is a photograph of the reference surface.

As seen in FIGS. 4(a) and (b) (Example 1), no difference was confirmed between the test surface and the reference surface. Also, there was no difference, in concentration (i.e., depth of the cracked part) of the cracked part (dotted black portion in the photograph) that was originally present on the main surface of the glass substrate, between the test surface and the reference surface. In other words, the expansion of the existing cracked part after the polishing was not observed. As a result, it was possible to manufacture the optical element having good product performance, in Example 1.

Meanwhile, as seen in FIGS. 5(a) and (b) (Comparative Example 1), it was confirmed that the concentration of the cracked part (dotted black portion in the photograph) that was originally present on the main surface of the glass substrate was darker in the test surface compared to the reference surface. In other words, the expansion of the existing cracked part after the polishing (particularly the increase in the depth of the cracked part) was observed. As a result, it was impossible to manufacture the optical element having good product performance, in Comparative Example 1.

(SEM Observation 2)

Next, for the glass substrate of Example 1 and the glass substrate of the Comparative Example 1, SEM observation was performed at a higher magnification. Photographs showing the results are FIGS. 6 and 7.

Figure 6:
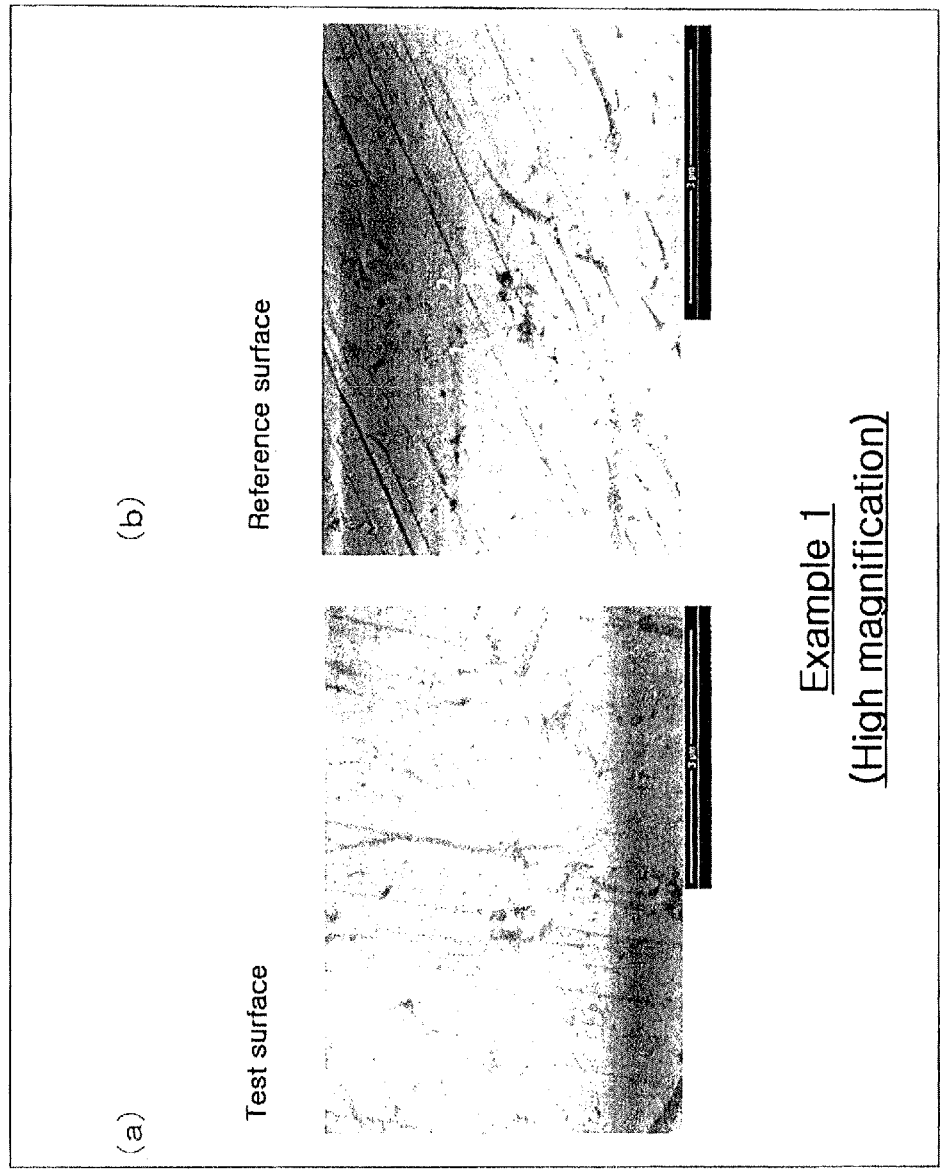
FIG. 6 is photograph illustrating a result obtained by performing the SEM observation at a higher magnification for the glass substrate in Example 1.

FIG. 6 is photograph illustrating a result obtained by performing the SEM observation at the higher magnification for the glass substrate in Example 1. FIG. 6(a) is a photograph of the test surface, and FIG. 6(b) is a photograph of the reference surface.

Figure 7:
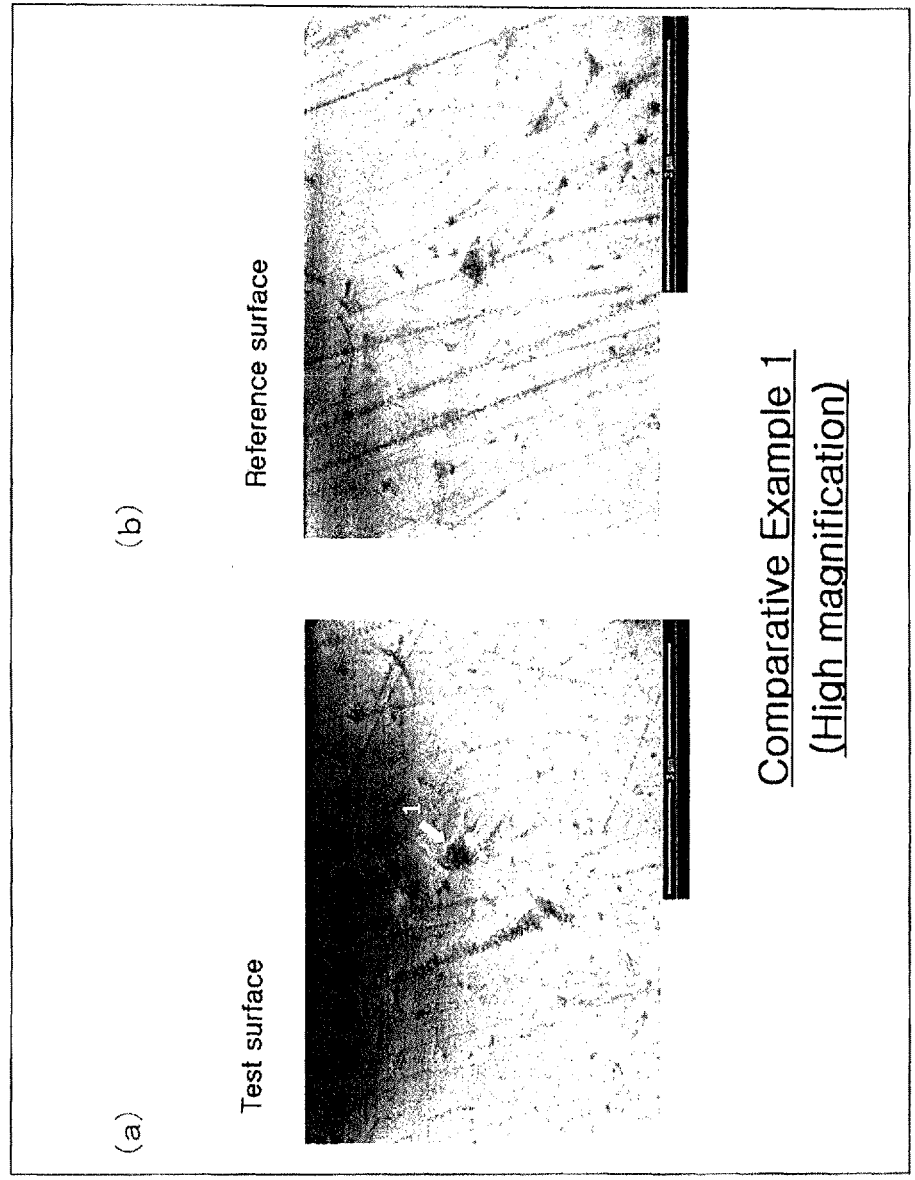
FIG. 7 is a photograph illustrating a result obtained by performing the SEM observation at a higher magnification for the glass substrate in Comparative Example 1.

FIG. 7 is a photograph illustrating a result obtained by performing the SEM observation at the higher magnification for the glass substrate in Comparative Example 1. FIG. 7(a) is a photograph of the test surface, and FIG. 7(b) is a photograph of the reference surface.

As seen in FIGS. 6(a) and (b) (Example 1), no difference was confirmed between the test surface and the reference surface. Also, there was no difference, in both width and concentration (i.e., depth of the cracked part) of the cracked part (dotted black portion in the photograph) that was originally present on the main surface of the glass substrate, between the test surface and the reference surface. In other words, the expansion of the existing cracked part after the polishing was not observed. As a result, it was possible to manufacture the optical element having good product performance, in Example 1.

Meanwhile, as seen in FIGS. 7(a) and (b) (Comparative Example 1), it was confirmed that the concentration of the cracked part (dotted black portion in the photograph) that was originally present on at least the main surface of the glass substrate was darker (particularly, the depth of the cracked part was increased) in the test surface compared to the reference surface. In other words, the expansion of the existing cracked part after the polishing was observed. As a result, it was impossible to manufacture the optical element having good product performance, in Comparative Example 1.

(Analysis on Images Obtained by SEM Observation 2)

In the present example, an analysis on images obtained by SEM observation 2 was performed in order to additionally obtain a quantitative value representing a change in depth of the cracked part. In summary, the test surface and the reference surface were compared with each other in brightness of a central portion of the cracked part displayed on the image. The comparison was performed on a plurality of points (test surface: sites 1 and 2, reference surface: sites 1 and 2) on the surface of the glass substrate of Example 1. Likewise, the comparison was performed on a plurality of points (test surface: sites 1 and 2, reference surface: sites 1 and 2) on the surface of the glass substrate of Comparative Example 1. The results are shown in the following table.

TABLE 1

| | | Test surface (A) | | | | Reference surface (B) | |
| --- | --- | --- | --- | --- | --- | --- | --- |
| | | High-magnification SEM observation | | | | High-magnification SEM observation | |
| | Site | Brightness of central portion of cracked part (Arbitrary unit) | Brightness of flat part (Arbitrary unit) | Determination | Site | Brightness of central portion of cracked part (Arbitrary unit) | Brightness of flat part (Arbitrary unit) |
| Example 1 | 1 | 80 | 160 | ○ | 1 | 80 | 160 |
| | 2 | 85 | | | 1 | 60 | |
| Comparative Example 1 | 1 | 50 | 160 | x | 1 | 80 | 160 |
| | 2 | 52 | | | 2 | 80 | |

Figure 8:
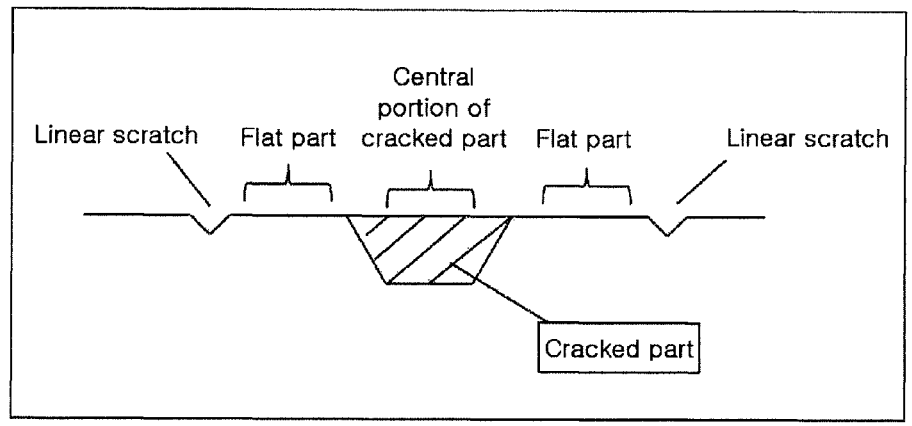
FIG. 8 is an enlarged sectional view schematically illustrating the vicinity of the surface of the glass substrate, which is assumed from the SEM observation result.

Each term of the above table is described with reference to FIG. 8. FIG. 8 is an enlarged sectional view schematically illustrating the vicinity of the surface of the glass substrate, which is assumed from the SEM observation result.

First, the contrast was adjusted at the time of image analysis. At that time, a flat part in the glass was used to adjust the contrast. The ⌈flat part⌋ is a peripheral portion of the cracked part, and refers to a location where the linear scratches and the cracked part are not present. For adjustment of contrast, a plurality of points on the surface of the glass substrate of Example 1 and a plurality of points on the surface of the glass substrate of comparative Example 1 were SEM-observed for the brightness of the flat part in the photograph, and the contrast was adjusted by making the brightness identical at all the points. Then, the brightness of the central portion of the cracked part shown in FIG. 8 was determined.

Referring to Table 1, in Example 1, when comparing the brightness of the central portion of the cracked part of the test surface with the brightness of the central portion of the cracked part of the reference surface, a reduction in brightness was not observed. In other words, the depth of the cracked part was not increased, so that the determination by the visual observation was good (○). It was found that the expansion of the cracked part was inhibited.

Meanwhile, in Comparative Example 1, when comparing the brightness of the central portion of the cracked part of the test surface with the brightness of the central portion of the cracked part of the reference surface, a considerable reduction in brightness was observed. In other words, the depth of the cracked part was increased, so that the determination by the visual observation was poor (x). It was found that the expansion of the cracked part was not inhibited.

Here, the estimated depth of the cracked part is intended to reflect at least any one of the depth of the recess and the depth of the low density part where cracks or the like are formed. The reason is because the reduction in brightness in the SEM image results from the reduction in density in a corresponding part, in addition to an increase in depth of the corresponding part. The same applies to the depth of the cracked part in SEM observation 1. Further, although a portion of the image obtained by the SEM observation may be dark, this is due to charge-up during the SEM observation but does not reflect the surface state.

(Cross-Sectional TEM Observation)

Further, for the glass substrate of Example 1 and the glass substrate of the Comparative Example 1, the cross-sectional TEM (Transmission Electron Microscope) observation was performed.

Figure 9:
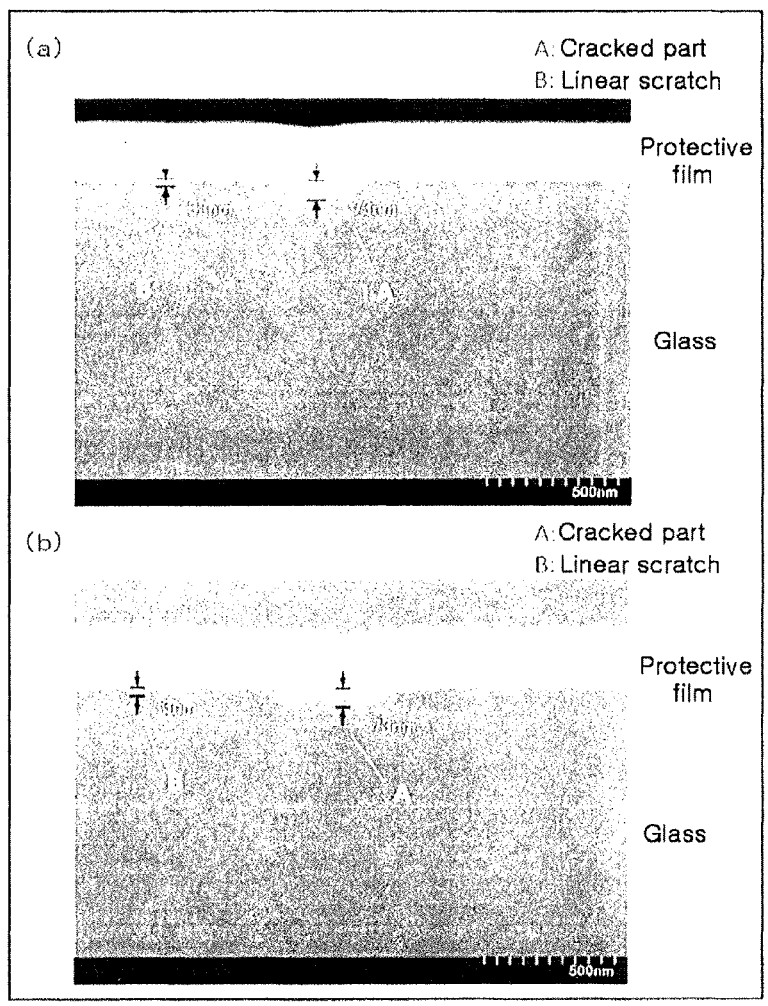
FIG. 9 is a photograph illustrating a result obtained through cross-sectional TEM observation for the glass substrate in Example 1.

FIG. 9 is a photograph illustrating a result obtained through the cross-sectional TEM observation for the glass substrate in Example 1. FIG. 9(a) is a photograph of the test surface, and FIG. 9(b) is a photograph of the reference surface.

Figure 10:
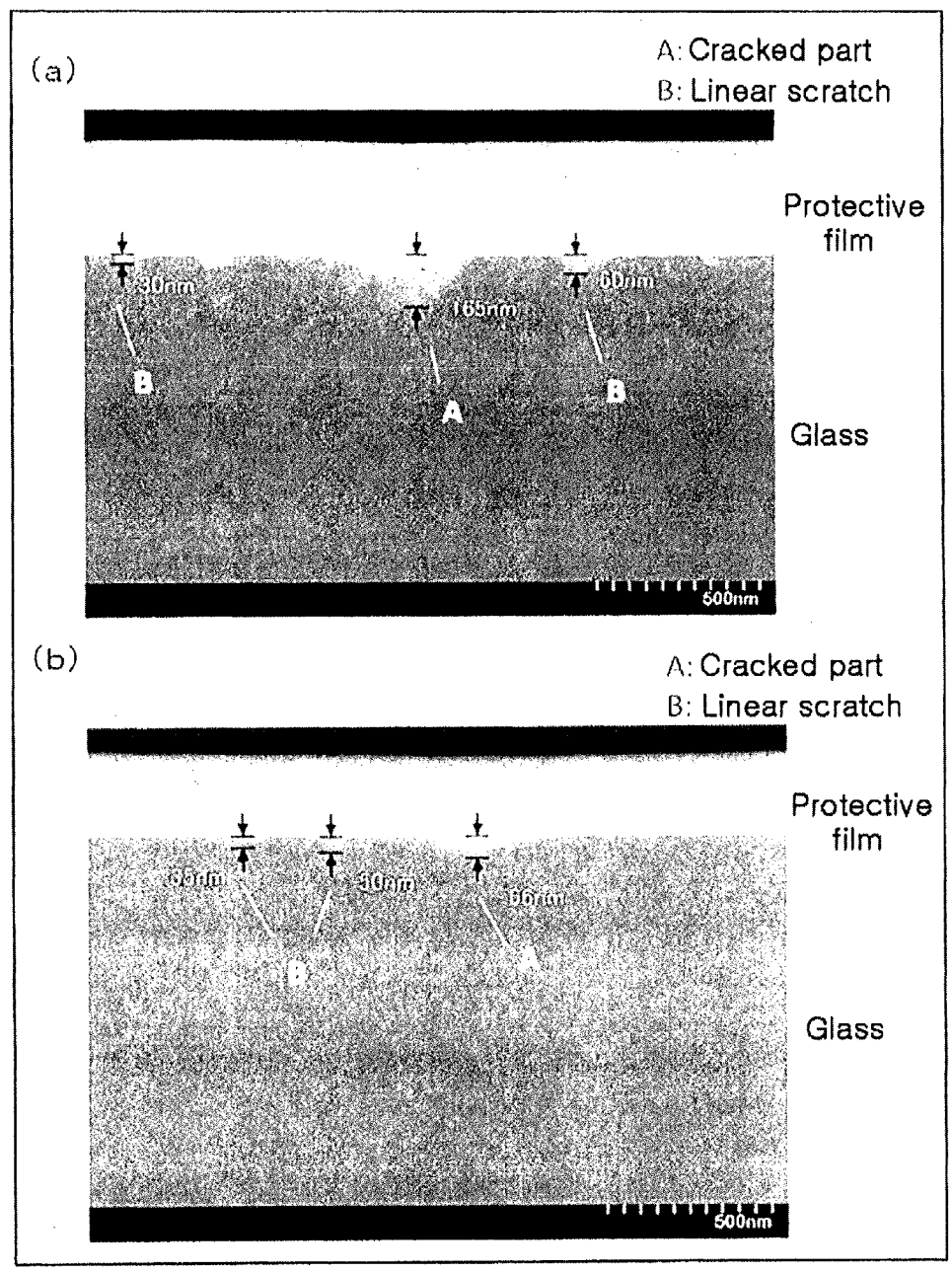
FIG. 10 is a photograph illustrating a result obtained through the cross-sectional TEM observation for the glass substrate in Comparative Example 1.

FIG. 10 is a photograph illustrating a result obtained through the cross-sectional TEM observation for the glass substrate in Comparative Example 1. FIG. 10(a) is a photograph of the test surface, and FIG. 10(b) is a photograph of the reference surface.

In FIGS. 9 and 10, the cracked part is denoted by reference character ⌈A⌋, and the linear scratch is denoted by reference character ⌈B⌋. Further, the protective film of C or the like is formed on the glass surface through vapor deposition or the like Here, we will pay attention to the cracked part of A, and the linear scratch of B will be described later.

In FIGS. 9(a) and 9(b) (Example 1), the cracked part A was observed. Any cracked part of the test surface and the reference surface is composed of a ⌈recess⌋ that is formed from the surface to the depth of about 30 nm, and a ⌈low contrast part⌋ that is formed in a range of about 40 nm under the recess. The low contrast part under the recess is a part (hereinafter also referred to as a ⌈low density part⌋) that is lower in density than the interior of the glass. It is believed that cracks or the like are formed in a structure. That is, it is thought that the recess is formed in the glass surface and the cracks or the like are formed under the recess by the physical impact exerted by the abrasive grains during the polishing. The cracked part depth shown in the drawings is a value estimated including the ⌈recess⌋ and the ⌈low density part⌋. When comparing the cracked part depth of the test surface with that of the reference surface, both of them are about 70 nm and there is no significant difference between them. In Example 1, it was found that the cracked part depth was not increased by the rinsing step and the expansion of the cracked part was inhibited. Further, the cracked part width is about 0.5 μm or less, and more precisely about 0.4 μm.

In FIGS. 10(a) and 10(b) (Comparative Example 1), first, the cracked part of the reference surface of FIG. 10(b) is composed of a 「recess」 that is formed from the surface to the depth of about 20 to 30 nm, and a 「low density part」 that is formed in a range of about 30 nm under the recess. It is believed that the low density part is a part where cracks or the like are formed. As shown in FIG. 10(b), the depth of the cracked part including the recess and the low density part is 66 nm.

Meanwhile, referring to the cracked part in the test surface shown in FIG. 10(a), it can be seen that the depth of the 「recess」 in the cracked part is equivalent to that of the reference surface, and the depth of the glow density parts under the recess is larger than that of the reference surface. As shown in FIG. 10(a), the depth of the cracked part including the recess and the low density part is 165 nm, and is 2.5 times as deep as the cracked part depth of the reference surface. Thus, in Comparative Example 1, it was found that the cracked part depth was increased by the rinsing step and the expansion of the cracked part occurred.

In the glass surface after the polishing, the recess or the low density part having the crack or the like is formed on the glass surface by the physical impact exerted by the abrasive grains. Further, a potential damage part such as a microcrack of a level that cannot be detected in the TEM observation remains under the recess or the low density part. It was believed that this potential damage part was selectively etched by the DI water treatment, thus resulting in the increase in the depth of the low density part as shown in FIG. 10(a).

(Knowledge of Linear Scratches)

This example is focused on the inhibition of the expansion of the cracked part, and it is possible to obtain the knowledge of the linear scratches from the above results. The term 「linear scratches」 refer to stripe scratches, which are different from the cracked part.

For example, referring to FIGS. 9(a) and 9(b), in Example 1, the linear scratch B is smaller in width than the cracked part, and has the width of about 0.1 μm or less. The depth of the linear scratch is smaller than that of the cracked part. It is not observed that both the width and the depth of the linear scratch tend to be increased by the rinsing step.

Further, referring to FIGS. 10(a) and 10(b), in Comparative Example 1, the linear scratch B has the width of about 0.1 μm or less. In Comparative Example 1, it is not observed that both the width and the depth of the linear scratch tend to be increased by the rinsing step. The depth is 35 to 50 nm in the reference surface, while it is 30 to 60 nm in the test surface. As such, there is no significant difference in depth between the reference surface and the test surface. It is believed that the linear scratch is mainly formed during the polishing in that its width or depth is smaller than that of the cracked part. The reason is because the polishing uses abrasive grains which are much smaller than those of the grinding and is performed under the condition where the treatment pressure is low. The reason why the depth of the linear scratch is not increased unlike the cracked part, is as follows: since the linear scratch is formed by the polishing, it exerts smaller physical impact on the glass surface compared to a case where the cracked part is generated. Therefore, it is considered that the potential damage part which is to be etched is rarely generated compared to the cracked part. Thus, it can be seen that the DI water affects differently on the cracked part and the linear scratch, and the DI water treatment leads to the expansion of the cracked part, which is the cause of the fogging.

Example 2

In Example 2, the above-described 「glass 2」 was used as the glass material of the glass substrate. The glass substrate was manufactured while other conditions remaining the same as Example 1.

Comparative Example 2

In Comparative Example 2, the above-described 「glass 2」 was used as the glass material of the glass substrate. The glass substrate was manufactured while other conditions remaining the same as Comparative Example 1.

<Evaluation 2>

Various evaluations were conducted for both the glass substrate of Example 2 and the glass substrate of the Comparative Example 2.

In Example 2, a difference between the test surface and the reference surface cannot be confirmed. Also, there was no difference between the test surface and the reference surface in the concentration (i.e., depth of the cracked part) of the cracked part (dotted black portion in the photograph) that was originally present on the main surface of the glass substrate. In other words, the expanded form of the cracked part that was originally present was not observed. As a result, it was possible to manufacture the optical element having good product performance, in Example 2.

Meanwhile, in Comparative Example 2, it was confirmed that the concentration of the cracked part (dotted black portion in the photograph) that was originally present on the main surface of the glass substrate was darker (particularly the depth of the cracked part was increased) in the test surface compared to the reference surface. In other words, the expansion of the cracked part that was originally present was observed. As a result, it was impossible to manufacture the optical element having good product performance, in Comparative Example 2.

Finally, the exemplary embodiments of the invention will be summarized.

Exemplary embodiment 1 of the present invention provides a method for manufacturing an optical element from glass after polishing, wherein at least any one of a cleaning liquid used in a cleaning step for the glass after the polishing and a rinsing liquid used in a rinsing step after the cleaning step inhibits a cracked part present on a surface of the glass after the polishing from being expanded.

In exemplary embodiment 2 according to exemplary embodiment 1, a diameter of the glass after centering may be preferably 15 mm or more.

In exemplary embodiment 3 according to exemplary embodiment 1 or 2, at least any one of the cleaning liquid and the rinsing liquid may be preferably an aqueous solution containing phosphate.

In exemplary embodiment 4 according to any one of exemplary embodiments 1 to 3, the glass may be preferably a phosphate glass.

In exemplary embodiment 5 according to exemplary embodiment 4, the phosphate glass may preferably contain fluorine.

In exemplary embodiment 6 according to exemplary embodiment 5, the phosphate glass containing the fluorine may preferably have a F content of 55 anion % or more and an O content of 45 anion % or less.

In exemplary embodiment 7 according to any one of exemplary embodiments 1 to 6, at least any one of the cleaning liquid and the rinsing liquid may be preferably a buffer solution having pH of 3 to 9.8 or less.

In exemplary embodiment 8 according to any one of exemplary embodiments 1 to 7, a preform used for mold press molding may be preferably used as the glass after the polishing.

In exemplary embodiment 9 according to any one of exemplary embodiments 1 to 7, the method may preferably include a polishing step of polishing the glass before the polishing, a cleaning step of cleaning the glass after the polishing with the cleaning liquid, and a rinsing step of rinsing the glass after the polishing with the rinsing liquid, after the glass has been subjected to the cleaning step.

What is claimed is:

1. A method for manufacturing an optical element from polished glass, comprising:
   a cleaning step of cleaning the polished glass with a cleaning liquid; and
   after the cleaning step, a rinsing step of rinsing the polished glass with a rinsing liquid,
   wherein at least one of the cleaning liquid or the rinsing liquid inhibits expansion of a cracked part of a surface of the polished glass that is formed as a result of abrasive grains present at the surface of the polished glass.

2. The method according to claim 1,
   further comprising, after the rinsing step, a centering step of grinding an outer peripheral portion of the polished glass,
   wherein a diameter of the polished glass after the centering step is 15 mm or more.

3. The method according to claim 1, wherein at least one of the cleaning liquid or the rinsing liquid contains phosphate.

4. The method according to claim 1, wherein the polished glass is a phosphate glass.

5. The method according to claim 4, wherein the phosphate glass contains fluorine.

6. The method according to claim 5, wherein the phosphate glass which contains the fluorine has a F content of 55 anion % or more and an O content of 45 anion % or less.

7. The method according to claim 1, wherein at least one of the cleaning liquid or the rinsing liquid is a buffer solution having pH of 3 to 9.8.

8. The method according to claim 1, wherein the polished glass is a preform used for mold press molding.

* * * * *